United States Patent
Chou et al.

(10) Patent No.: US 8,463,276 B2
(45) Date of Patent: Jun. 11, 2013

(54) FEMTOCELL SELF ORGANIZATION AND CONFIGURATION PROCESS

(75) Inventors: Chie-Ming Chou, Qingshui Town (TW); Jung-Mao Lin, Dali (TW)

(73) Assignee: Industrial Technology Research, Chutung, Hsinchu (TW)

( * ) Notice: Subject to any disclaimer, the term of this patent is extended or adjusted under 35 U.S.C. 154(b) by 247 days.

(21) Appl. No.: 12/683,897

(22) Filed: Jan. 7, 2010

(65) Prior Publication Data

US 2010/0261467 A1    Oct. 14, 2010

Related U.S. Application Data

(60) Provisional application No. 61/168,763, filed on Apr. 13, 2009.

(51) Int. Cl.
| | |
|---|---|
| *H04M 3/00* | (2006.01) |
| *H04W 4/00* | (2009.01) |
| *H04W 40/00* | (2009.01) |
| *H04B 1/38* | (2006.01) |

(52) U.S. Cl.
USPC ........ 455/446; 455/418; 455/422.1; 455/561; 370/338

(58) Field of Classification Search
USPC ................. 455/41.2, 63.1–63.2, 66.1, 67.11, 455/70, 410–411, 418–420, 422.1, 434, 432.3, 455/435.1–435.2, 443–451, 452.1–452.2, 455/453, 500, 509, 513–514, 522, 524–526, 455/550.1, 552.1, 555, 556.1–556.2, 557, 455/561, 423–425, 517; 370/252, 254–255, 370/328–329, 338, 341, 349, 310
See application file for complete search history.

(56) References Cited

U.S. PATENT DOCUMENTS

| | | | |
|---|---|---|---|
| 6,041,228 A * | 3/2000 | Niska et al. ................... | 455/419 |
| 7,558,592 B2 * | 7/2009 | Hart et al. ...................... | 455/522 |
| 7,808,946 B2 * | 10/2010 | Claussen et al. .............. | 370/328 |
| 7,817,997 B2 * | 10/2010 | Nylander et al. ........... | 455/422.1 |
| 8,144,725 B2 * | 3/2012 | Bienas et al. ................. | 370/449 |
| 2007/0097939 A1 * | 5/2007 | Nylander et al. ............. | 370/338 |
| 2007/0225029 A1 * | 9/2007 | Abusch-Magder ........... | 455/525 |
| 2008/0056150 A1 * | 3/2008 | Kujala .......................... | 370/252 |
| 2008/0298275 A1 * | 12/2008 | De Sousa ................... | 455/562.1 |
| 2009/0047945 A1 * | 2/2009 | Zhang et al. ................ | 455/424 |
| 2009/0061924 A1 | 3/2009 | Morrill et al. | |
| 2009/0092096 A1 * | 4/2009 | Czaja et al. ................... | 370/331 |
| 2009/0098872 A1 * | 4/2009 | Deshpande et al. ........ | 455/435.2 |
| 2009/0135758 A1 * | 5/2009 | Alper et al. .................. | 370/328 |
| 2009/0253421 A1 * | 10/2009 | Camp et al. .................. | 455/418 |
| 2009/0253461 A1 * | 10/2009 | Kuwahara ..................... | 455/561 |
| 2010/0016022 A1 * | 1/2010 | Liu et al. ....................... | 455/561 |

* cited by examiner

*Primary Examiner* — Meless Zewdu
(74) *Attorney, Agent, or Firm* — Finnegan, Henderson, Farabow, Garrett & Dunner, LLP

(57) ABSTRACT

A base station includes an interface for providing communication with at least one other base station and communication with a network server in a communication system, a processor coupled to the interface, and a memory coupled to the processor. The memory stores program instructions executable by the processor to connect to the network server using the interface, send information to the network server regarding femtocell capability, configure operating parameters of the base station based on the information, including to configure transmission power of the base station, and operate the base station based on the operating parameters.

25 Claims, 8 Drawing Sheets

FEMTOCELL SELF ORGANIZATION AND CONFIGURATION PROCESS

RELATED APPLICATIONS

This application is based upon and claims the benefit of priority from U.S. Provisional Patent Application No. 61/168,763, filed Apr. 13, 2009, the entire contents of which are incorporated herein by reference.

TECHNICAL FIELD

A system and method disclosed herein generally relate to wireless networking and, more specifically, to a system and method for operating a network including a femto base station.

DESCRIPTION OF RELATED ART

A femto base station, also known as an access point base station, is a smaller version of a cellular telephone tower, which are owned and operated by cellular telephone companies. These towers provide coverage over large areas of a communication network, or "macro network." Such communication network may be a radio network, which is a network system distributing programming to multiple stations simultaneously, or slightly delayed, for the purpose of extending total coverage beyond the limits of a single broadcast signal. The area of coverage of each such tower is sometimes referred to as a "macrocell." The area of coverage of a femto base station is referred to as a "femtocell." Localized femtocells may be established within and overlying portions of macrocells to handle areas with relatively dense concentrations of mobile users, and may be designed and located for use in residential or small business environments.

A femtocell is a low-power wireless access point that operates in licensed spectrum to connect standard mobile devices to a mobile operator's network. For example, a femtocell currently enables 2 to 8 mobile phones to connect to the service provider's network via broadband, such as DSL or cable, and allows the service provider to extend service coverage indoors, especially where access to the macro network would otherwise be limited or unavailable. When used in dense deployments, femtocells have the potential of delivering an order of magnitude more capacity than the macrocell alone.

The benefits of femtocells can be explained from two aspects. From the operator's viewpoint, the benefits include (1) reduced backhaul capacity requirements; (2) increased wireless capacity; (3) reduced coverage holes and creating of new converged services. From the customer's viewpoint, the benefits includes (1) superior in-building coverage and quality without change in phones; and (2) one number and one phone and location specific pricing.

Femtocells may belong to either a Closed Subscriber Group (CSG) or an Open Subscriber Group (OSG), both of which operate in accordance with guidelines set forth in the IEEE 802.16m standard. A CSG femto base station is accessible only to a set of pre-defined or authorized user stations, which typically consist of registered user stations of subscribers to the CSG. In emergency situations, however, a CGS may allow non-registered user stations to access the femto base station. Unlike a CSG, the base station of an OSG is accessible to any user station.

Femto base stations are relatively inexpensive, easy to install, and provide the above described benefits. The use of femto base stations may also increase overall connectivity in the wireless network environment by increasing the number of base stations in a given area. However, the introduction of femtocells to the general public may result in problems.

SUMMARY

In accordance with a first aspect of the present disclosure, there is provided a femto base station in a femtocell. The femto base station comprises an interface for providing communication with at least one other base station and communication with a network server in a communication system, a processor coupled to the interface, and a memory coupled to the processor. The memory stores program instructions executable by the processor to connect to the network server using the interface, send information to the network server regarding femtocell capability, configure operating parameters of the femto base station based on the information, including to configure transmission power of the femto base station, and operate the femto base station based on the operating parameters.

According to a second aspect of the present disclosure, there is provided a network server comprising an interface for providing communication with at least one femto base station, a processor coupled to the interface, and a memory coupled to the processor. The memory stores program instructions executable by the processor to connect to a femto base station using the interface, receive information from the femto base station regarding femtocell capability, send network information to the femto base station, calculate a number of resource units for the femto base station based on the femtocell capability information, receive, from the femto base station, signal strengths corresponding to a plurality of carrier frequencies included in the network information, select at least one carrier frequency from the plurality of carrier frequencies based on the signal strengths and the femtocell capability information, and assign the selected at least one carrier frequency with the number of resource units to the femto base station.

According to a third aspect of the present disclosure, there is provided a method for performing self-organization and configuration of a femto base station connectable to a network server. The method comprises sending information to the network server regarding femtocell capability, configuring operating parameters of the femto base station based on the information, including configuring transmission power of the femto base station, and operating the femto base station based on the operating parameters.

According to a fourth aspect of the present disclosure, there is provided a base station in a cell. The base station comprises an interface for providing communication with at least one other base station and communication with a network server in a communication system, a processor coupled to the interface, and a memory coupled to the processor. The memory stores program instructions executable by the processor to connect to the network server using the interface, send information to the network server regarding cell capability, configure operating parameters of the base station based on the information, including to configure transmission power of the base station, and operate the base station based on the operating parameters.

According to a fifth aspect of the present disclosure, there is provided a method for performing self-organization and configuration of a base station connectable to a network server. The method comprises sending information to the network server regarding cell capability, configuring operating parameters of the base station based on the information, including configuring transmission power of the base station, and operating the base station based on the operating parameters.

It is to be understood that both the foregoing general description and the following detailed description are exemplary and explanatory only, and are not restrictive of the embodiments of the application, as claimed.

BRIEF DESCRIPTION OF THE DRAWINGS

The accompanying drawings, which are incorporated in and constitute a part of this specification, illustrate various embodiments. In the drawings.

DESCRIPTION OF THE EMBODIMENTS

Figure 1:
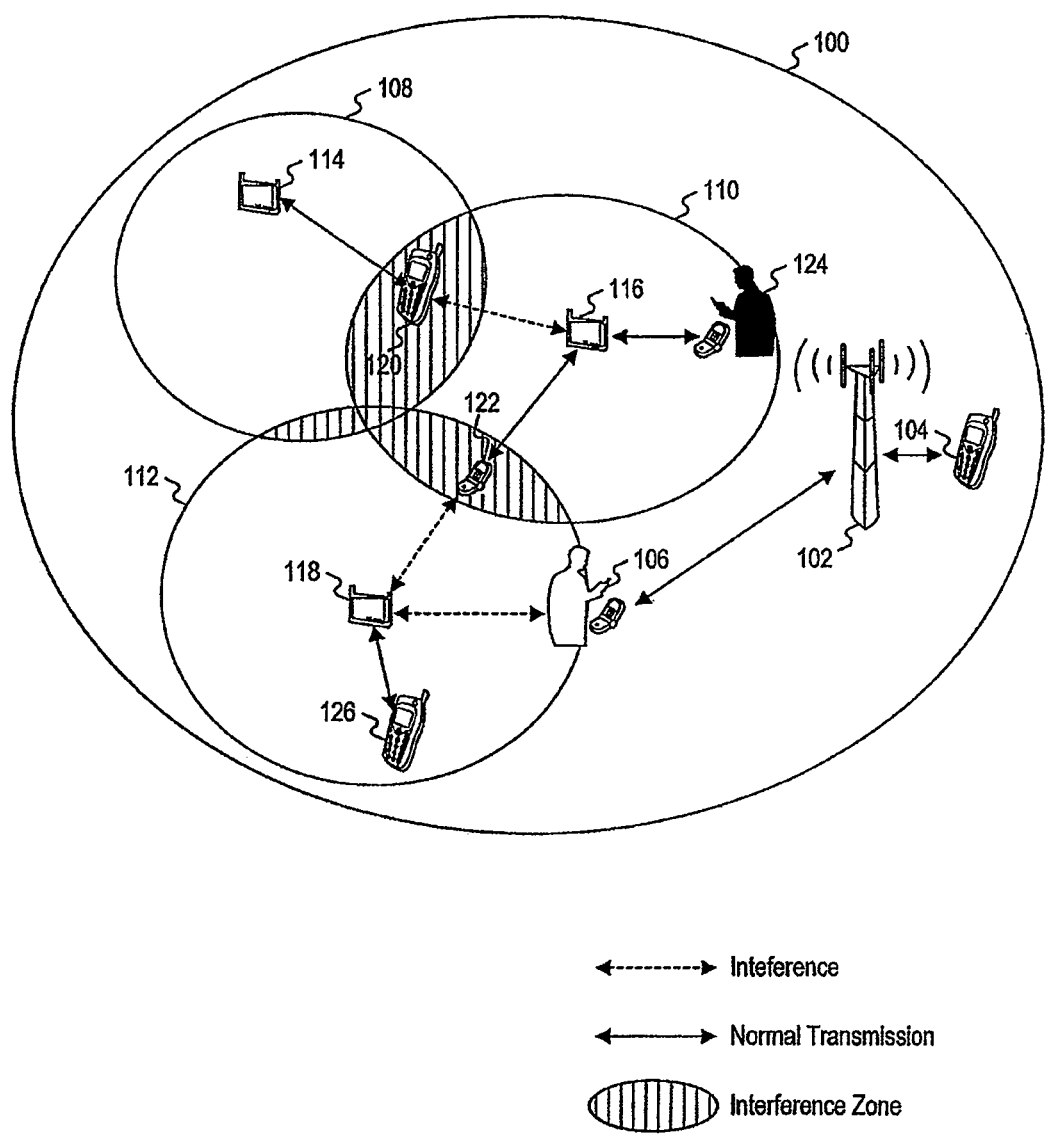
FIG. 1 shows an exemplary macrocell.

In the following description, for purposes of explanation and not limitation, specific techniques and embodiments are set forth, such as particular sequences of steps, interfaces, and configurations, in order to provide a thorough understanding of the techniques presented herein. While the techniques and embodiments will primarily be described in context with the accompanying drawings, those skilled in the art will further appreciate that the techniques and embodiments can also be practiced in other communication systems.

Reference will now be made in detail to exemplary embodiments, examples of which are illustrated in the accompanying drawings. Wherever possible, the same reference numbers will be used throughout the drawings to refer to the same or like parts.

The present inventors have discovered problems caused by deployment of femtocells. One problem caused by the arbitrary deployment of femtocells in an existing network is the interference that may result both between femtocells and macrocells and amongst different femtocells. Because femtocells require no network planning, operators often do not know where, if any, individual femtocells are deployed and cannot reconfigure their macro network in order to account for the individual femtocells. Consequently, interference may result from the lack of unique spectrums for femtocell networks and inadequate spectrum planning in the wider network.

For example, a network operator might license a single frequency in the frequency band of 1800 MHz to deploy a macrocell and multiple femtocells. Because femtocells only work in the frequencies licensed to the network they are in, the same frequency is utilized by the macrocell and femtocells. Consequently, a macrocell user near a femtocell may experience interference from the femto base station. Although interference may be resolved by a handover of the user from the macrocell to the femtocell, handover is not an option when the femtocell belongs to a CSG, in which the service is limited to registered users. Consequently, in networks with CSGs, transmissions between a macro user unit and its macro base station may suffer from a near-far problem in which a signal received by the user from a nearby femto base station is stronger than, and may mask, a signal received from the macro base station located further away. For example, a user unit that is located closer to transmitter A than it is from transmitter B receives more power from the nearby transmitter A when both transmitters A and B transmit signals simultaneously at equal powers. The user unit in this case may treat signals from transmitter B as noise, and signals from transmitter B may become difficult, if not impossible, to be understood. In order to compensate for the near-far problem, a user unit may increase its transmit power with its serving base station while it is within the coverage area of another base station. The resultant high power transmission creates interference because of its shared frequency with other transmissions.

The near-far problem may also occur amongst femtocells. For example, in high-rise building accommodations where femto base stations may be located within close proximity to each other and may overlap, femto users on different floors may create interference amongst each other. Additionally, densely deployed femtocells in these situations may also suffer from a hidden terminal problem, in which the presence of a femto base station is unknown to adjacent femto base stations and may cause unexpected interference with transmissions of those femto base stations. Further, the transmitting power of a femto base station also influences the interference with other femto base stations.

Accordingly, there is a need for spectrum planning in the network to mitigate interference both between femtocells and macrocells and among different femtocells. Further, in conventional wireless cellular network, a cell planning scheme is employed to assign the operating parameters which include carrier frequency, power, bandwidth, etc. for individual macro cell base stations. The frequency re-use concept is also applied to improve overall network performance with limited wireless resources. However, cell planning is not suitable for femtocell development. Therefore, there is a need for another type of scheme that can be used with femto base stations.

Methods, apparatus, and systems disclosed herein are provided to address one or more of the above described problems by providing self-organizing and configuring femtocells.

FIG. 1 shows an exemplary macrocell 100 of a wireless network ("network"). Such network is a network system which distributes programming to multiple stations simultaneously, or with small delay, for the purpose of extending total coverage beyond the limits of a single signal. Macrocell 100 includes a macrocell base station (macro BS) 102 which provides service to user stations 104 and 106. The user stations can be mobile stations such as mobile telephones ("cellular" telephones) or mobile computer stations including, for example, portable, pocket, hand-held, computer-included, or car-mounted mobile stations which communicate voice and/or data in a radio access network.

Femtocells 108, 110, and 112 are deployed near MBS 102 and overlie portions of macrocell 100. Femtocells 108, 110, and 112 respectively contain femto base stations (femto BSs) 114, 116, and 118. Macro BS 102 and femto BSs 114, 116, and 118 are generally fixed stations that communicate with the user stations and may also each be referred to as, for example, a node, an access point, etc. Femto BS 114 services a user station 120, femto BS 116 services user stations 122 and 124, and femto BS 118 services a user station 126.

Hereafter, a "macro user station" refers to a user station serviced by a macro base station, and a "femto user station" refers to a user station serviced by a femto base station.

Therefore, user stations 104 and 106 are macro user stations, and user stations 120, 122, 124, and 126 are femto user stations.

Because of the proximity of femto BSs 114, 116, and 118 to each other, areas of their communication coverage overlap when they transmit on the same frequency. These areas of overlapping femtocells 108, 110, and 112, or interference zones, are shown in FIG. 1 as cross-hatched areas between femto BSs 114, 116, and 118. User stations located within these interference zones, such as femto user stations 120 and 122, may experience interference from nearby base stations, to which they are not a subscriber, when receiving information on the same frequency. For example, the communication of femto user station 120 with femto BS 114, shown as a solid line, may experience interference from nearby femto BS 116, shown as a dotted line. As another example, the communication of femto user station 122 with femto BS 116, shown as a solid line, may experience interference from nearby femto BS 118, shown as a dotted line.

Moreover, because femtocells 108, 110, and 112 overlie macrocell 100, macro user stations served by femto BS 102 may experience interference from nearby femtocells. For example, macro user station 106, served by macro BS 102 and located in the vicinity of femto BS 118, may experience interference from femto BS 118 while communicating with macro BS 102.

Figure 2:
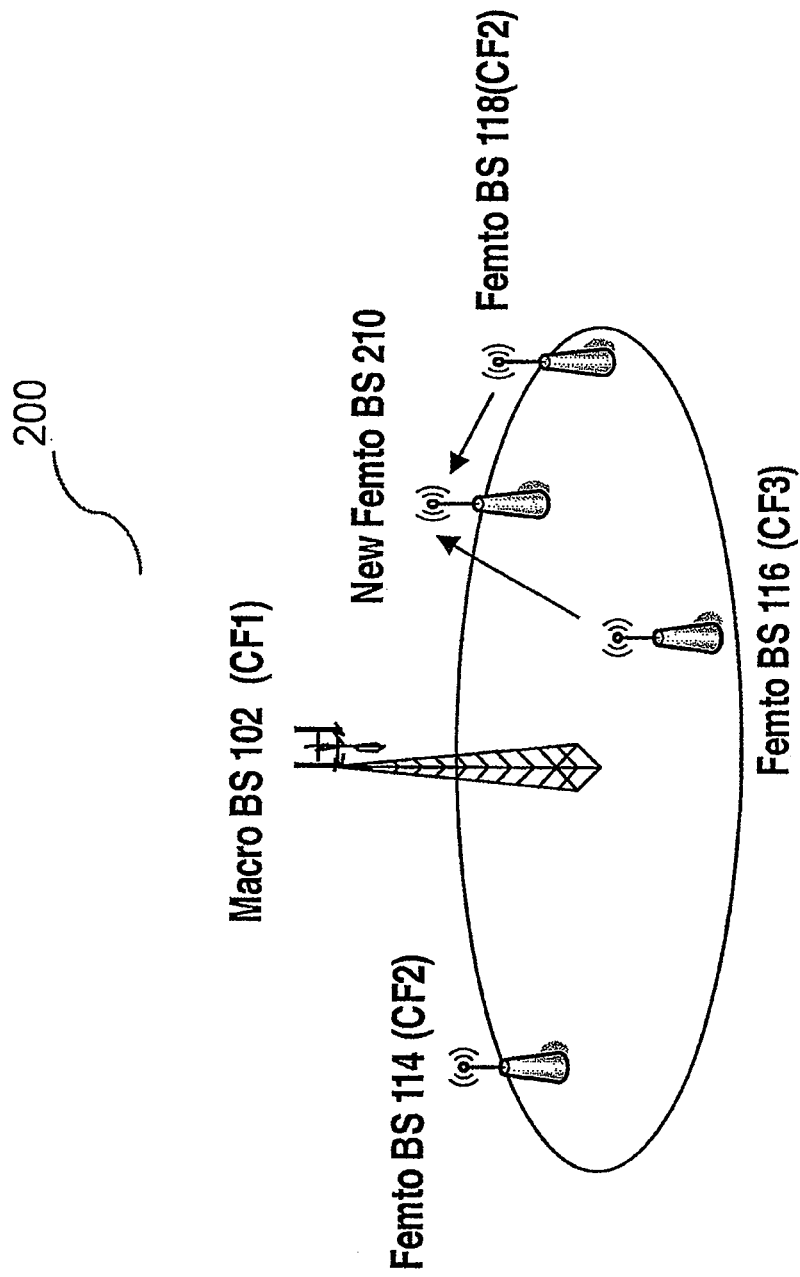
FIG. 2 shows an exemplary macrocell with a new femto base station.

FIG. 2 shows an exemplary macrocell 200 in accordance with one embodiment. The physical layout of macrocell 200 is substantially similar to macrocell 100 shown in FIG. 1, and includes macro BS 102, femto BSs 114, 116, and 118, and a new femto BS 210. CF1, CF2, and CF3 represent carrier frequencies for macro BS 102 and femto BSs 114, 116, and 118. CF1, CF2, and CF3 may be different or the same. There are fewer femtocell interference problems when the femtocells use different carrier frequencies relative to the surrounding macro network for the cellular telecommunication system. When a femto BS selects the same carrier frequency as surrounding macro cells or neighbor femtocells, the mutual interference between macro cells and femtocells or among femtocells may increase.

Figure 3:
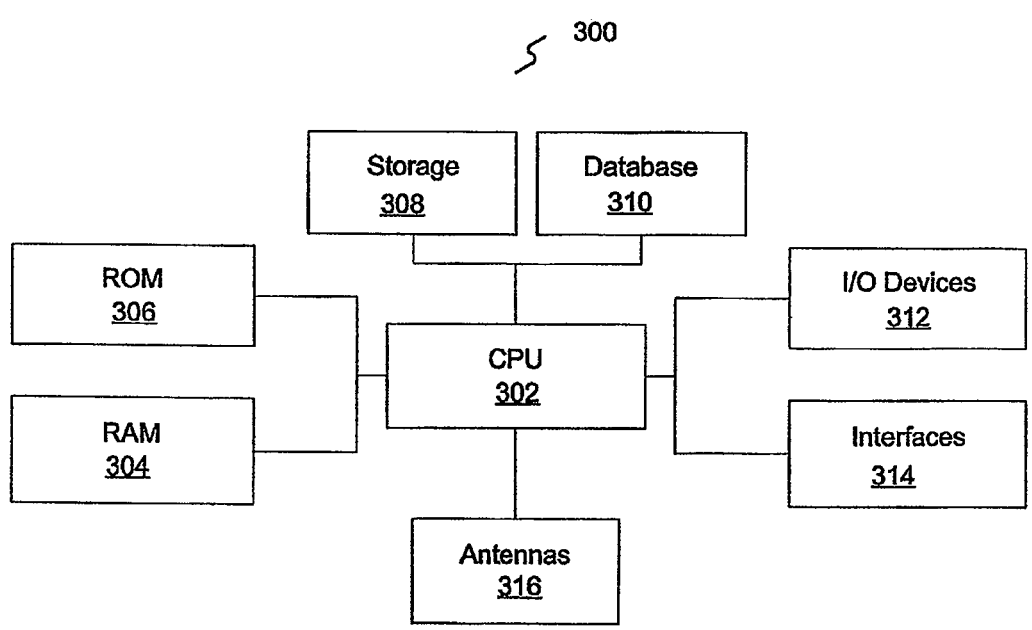
FIG. 3 shows an exemplary base station.

FIG. 3 illustrates a block diagram of an exemplary base station 300, according to an exemplary embodiment. For example, macro user station 300 may be macro BS 102 or any of femto BSs 114, 116, or 118 (as shown in FIG. 2). In FIG. 3, base station 300 may include one or more of the following components: at least one central processing unit (CPU) 302 configured to execute computer program instructions to perform various processes and methods, random access memory (RAM) 304 and read only memory (ROM) 306 configured to access and store information and computer program instructions, storage 308 to store data and information, databases 310 to store tables, lists, or other data structures, I/O devices 312, interfaces 314, antennas 316, etc. Each of these components is well-known in the art and will not be discussed further.

Figure 4:
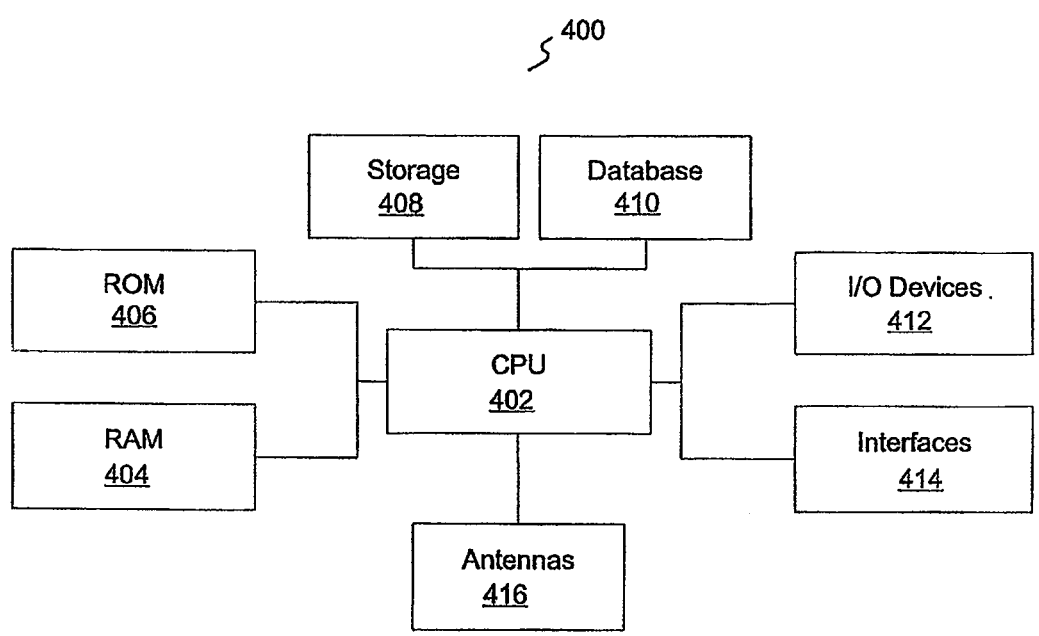
FIG. 4 shows an exemplary network server.

FIG. 4 illustrates a block diagram of an exemplary network server 400, according to an exemplary embodiment. With reference to FIG. 4, network server 400 may include one or more of the following components: at least one central processing unit (CPU) 402 configured to execute computer program instructions to perform various processes and methods, memory 404 configured to access and store information and computer program instructions, storage 408 to store data and information, databases 410 to store tables, lists, or other data structures, I/O devices 412, interfaces 414, antennas 416 etc. In one exemplary embodiment, network server 400 may be a stand-alone device including the components shown in FIG. 4. In another exemplary embodiment, network server 400 may exist within a femto BS. Each of these components is well-known in the art and will not be discussed further.

Figure 5:
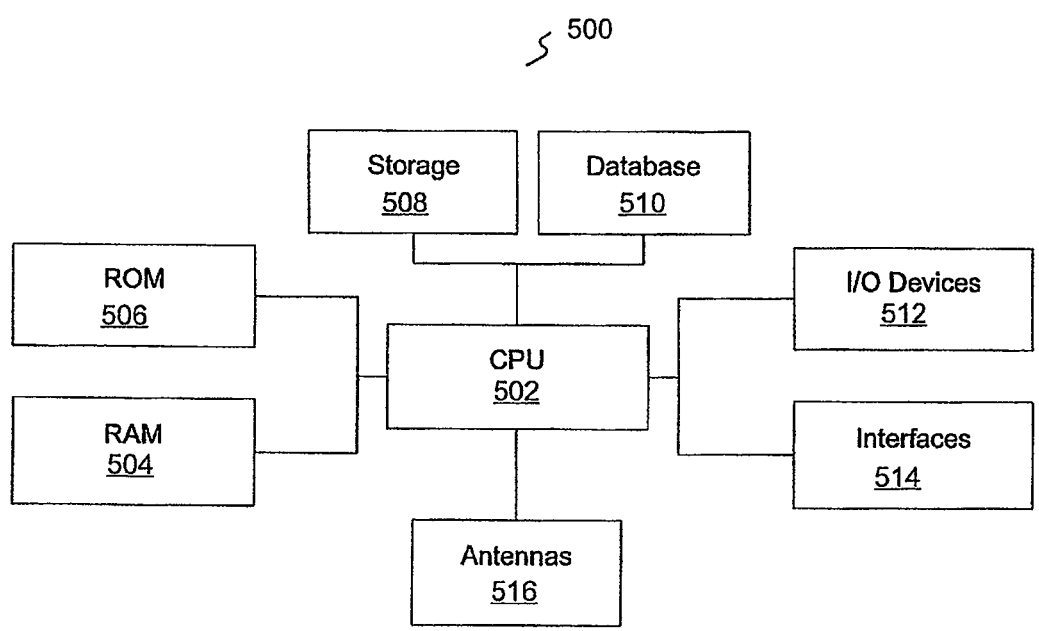
FIG. 5 shows an exemplary femtocell user station.

FIG. 5 illustrates a block diagram of an exemplary user station 500, according to an exemplary embodiment. For example, the user station 500 may be any of macro or femto user stations 104, 106, 120, 122, 124, or 126 (FIG. 1). In FIG. 5, user station 500 may include one or more of the following components: at least one central processing unit (CPU) 502 configured to execute computer program instructions to perform various processes and methods, random access memory (RAM) 504 and read only memory (ROM) 506 configured to access and store information and computer program instructions, storage 508 to store data and information, databases 510 to store tables, lists, or other data structures, I/O devices 512, interfaces 514, antennas 516 etc. Each of these components is well-known in the art and will not be discussed further.

Figure 6:
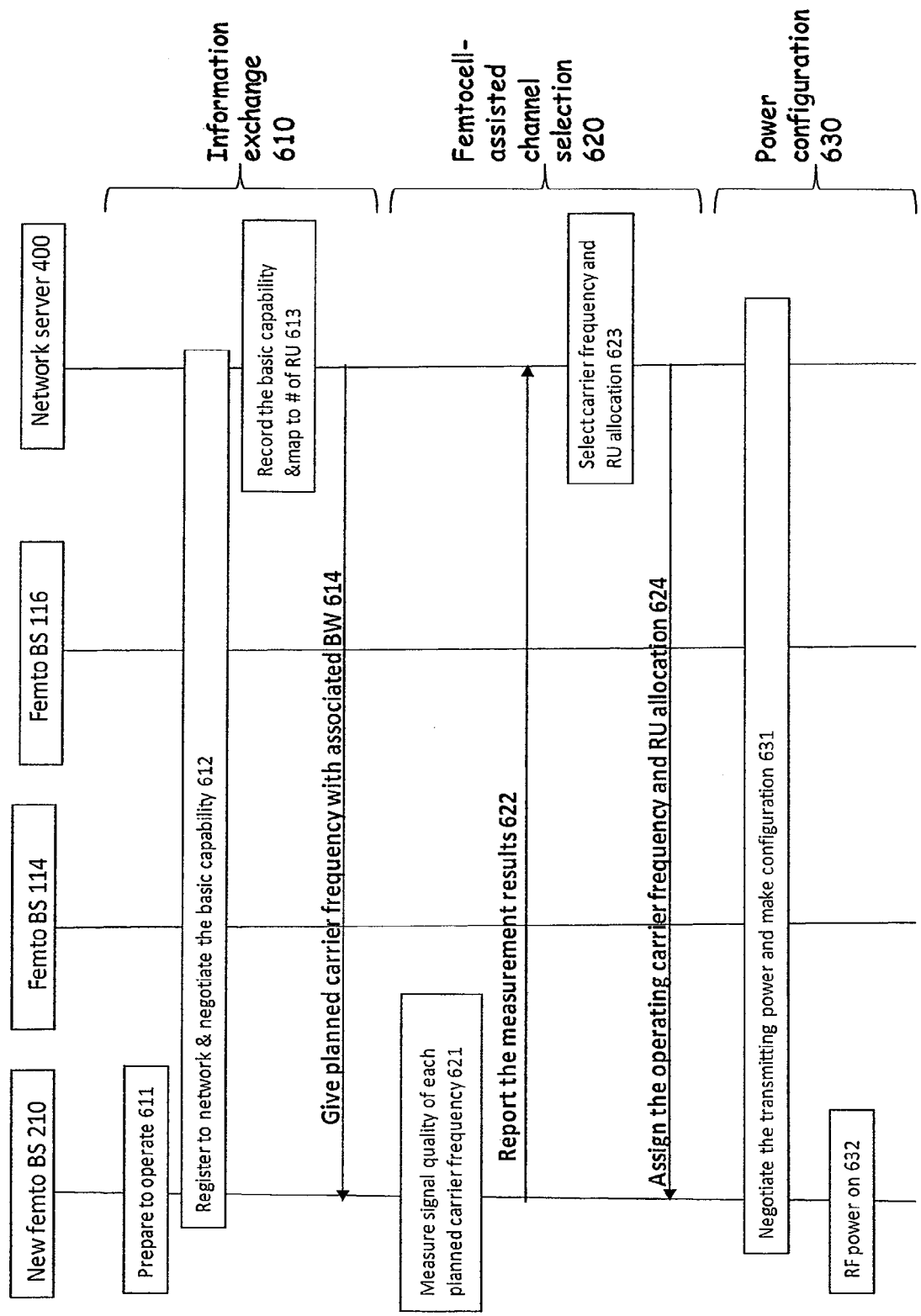
FIG. 6 shows an exemplary process for self-organization and configuration of a femto base station.

FIG. 6 shows a flow diagram of a process for self-organization and configuration by a femto BS according to an exemplary embodiment. The self-organization and configuration process performed by the femtocell BS includes three steps: information exchange 610, femtocell-assisted resource selection 620, and power configuration 630. The overview of these three steps is shown in FIG. 6.

With reference also to FIG. 2, in information exchange 610, a new femto BS 210 prepares to operate and connects to network server 400 (611). Femto BS 210 registers with network server 400 and negotiates to exchange information required for self-configuration (612). Negotiations may include, but are not limited to, femto BS 210 reporting its basic capability to network server 400, the basic capability including femtocell backhaul capability, multi-carrier support capability, an allowable power region, and other necessary information. After receiving the capability information, network server 400 records this information and calculates a number of required resource units (RU) to support a backhaul link capability (613).

The backhaul capability of femto BS 210 is the supported data rate of a hardwired connector to which femto BS 210 connects. When femto BS 210 operates, network server 400 ensures the air interface bandwidth can support the backhaul capability of the femto BS 210. To be able to do so, network server 400 computes a number of resources that can support the backhaul capability of femto BS 210. As used herein, a resource may be a resource unit (RU) as defined in IEEE 802.16m systems, or a resource block (RB) as defined for cellular Long-Term Evolution (LTE) systems. A resource unit, as used in some embodiments, is defined by the IEEE P802.16m/D3 standard as a granular unit in frequency and time, described by the number of OFDMA subcarriers and OFDMA symbols.

After network server 400 receives from femto BS 210 the backhaul capability of femtocell BS 210, network 650 uses the following equation (1) to compute the number of required RUs.

$$\text{RU\_numbers} = \frac{BW \times \text{frame\_duration}}{\text{robust\_MCS} \times \text{symbol\_RU}}. \quad (1)$$

in which BW represents a backhaul bandwidth of femto BS (in bits per second); frame_duration represents a frame length (in second) of the wireless network system; robust_MCS represents a set of robust modulation and coding that femto BS supports; and symbol_RU represents number of symbols that can be carried in a RU. Different wireless network systems may have different frame durations.

After network server 400 computes the number of required resource units, network server 400 provides to femto BS 210 a planned carrier frequency with corresponding bandwidth (614). The planned carrier frequency can be the same as or different from the carrier frequency CF1 of macro BS 102 (as shown in FIG. 2). The size of the planned carrier frequency bandwidth is the same as the allowable bandwidth size in macro cell network 200. For example, the allowable bandwidth size may be 5 MHz, 7 MHz, 8.75 MHz, 10 MHz, or 20 MHz in an IEEE 802.16m system. The planning of carrier frequency is well-known in the art and will not be discussed further.

In femtocell-assisted resource (or RU) selection 620, femto BS 210 scans each carrier frequency based on the planned carrier frequency and associated bandwidth information provided and measures a corresponding received signal strength (621). After measuring the received signal strength for each planned carrier frequency, femto BS 210 reports the measurement results to network server 400 (622). Network server 400 selects the proper carrier frequency and RU allocation based on the measurement results received from femto BS 210 and the backhaul capability of femto BS 210 (623). Then, network server 400 assigns the selected carrier frequency to femto BS 210 (624).

Femtocell-assisted resource selection 620 may be run periodically since network conditions may change when femto BSs are powered on/off in the network and the resource usage may be dynamic. Therefore, a periodic re-selection may help with reconfiguring and optimizing the network. The period may be per hour, per day, or per week.

In power configuration 630, network server 400 verifies the interference level of operating femto BSs 114, 116, 118 and 210 in surrounding coverage of new femto BS 210 and adjusts transmission power of new femto BS 210 (631). After network server 400 ensures that self organization of femto BS 210 is acceptable for the other operating femto BSs 114, 116 and 118, femto BS 210 starts operating (632).

Figure 7:
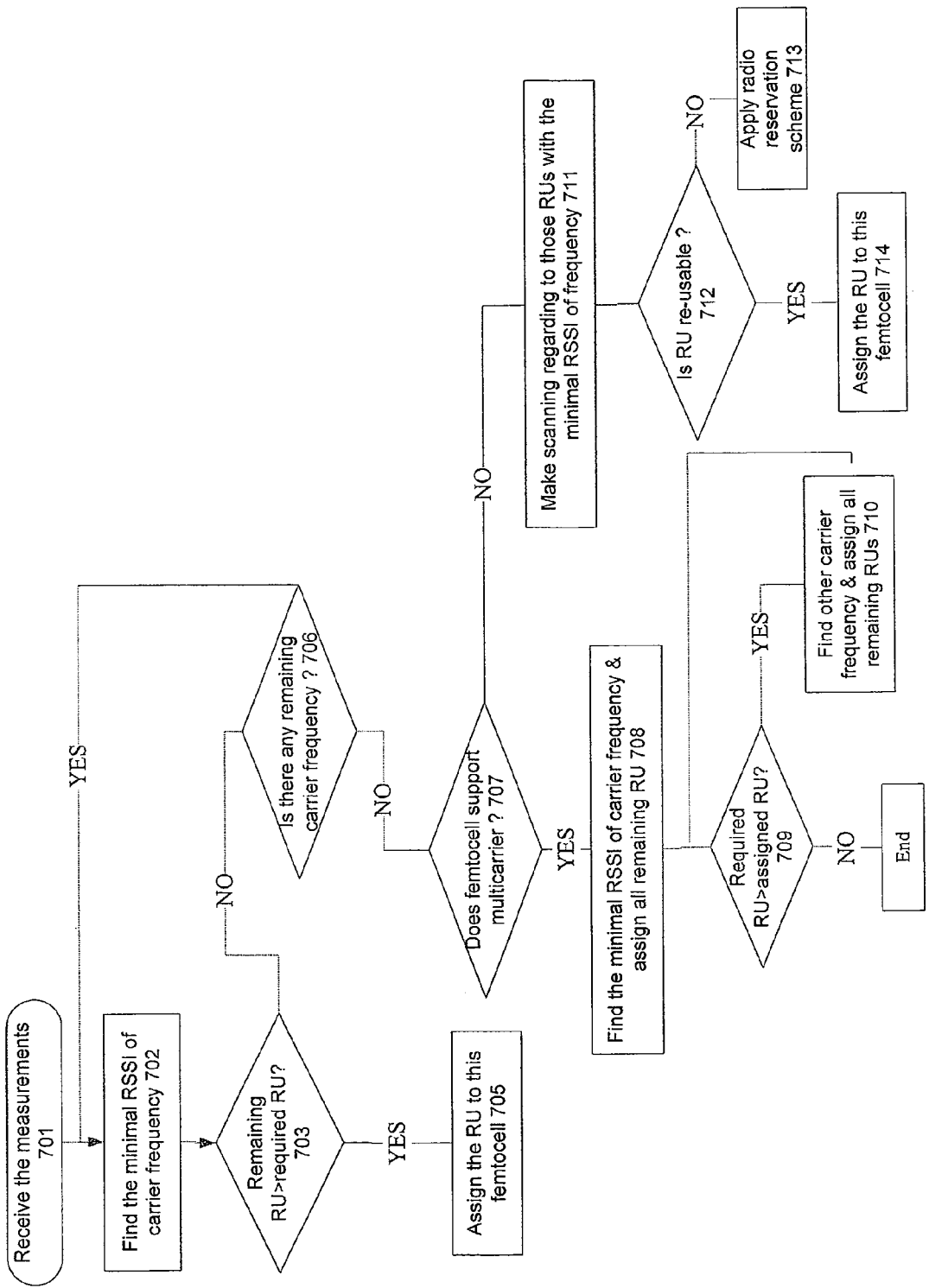
FIG. 7 shows a flowchart of an exemplary process for selecting a suitable wireless resource for a femto base station.

FIG. 7 shows a flowchart of an exemplary process executed by network server 400 for selecting a suitable wireless resource for a femto BS. In accordance with the process, network server 400 receives the measurement results from femto BS 210 (701). After receiving the measurements, network server 400 selects a carrier frequency with minimum received signal strength indication (RSSI), which is a measurement of the power present in the received signal, and checks the resource (or RU) usage of the selected carrier frequency (702). The carrier frequency with minimum RSSI is one at which femto BS 210 can operate and can have low interference with use of that carrier frequency far away from femto BS 210. When checking the RU usage of a selected carrier frequency, network server 400 may look up the location information of femto BS 210 and identify the surrounding femto BSs (such as femto BS 114, 116 or 118) with the same carrier frequency.

Next, network server 400 determines if a number of remaining RUs (RUs that were not used in the frequency carrier for surrounding operating femtocell BSs) is larger than a required number of RUs of femtocell BS 210 (703). If the number of remaining RUs is greater (703—yes), then network server 400 assigns the selected carrier frequency and RUs to femto BS 210 (705). Further, network server 400 updates the RU usage information in a network database (not shown).

Otherwise, if the number of remaining RUs is less than the required number of RUs of femtocell BS 210 (703—no), network server 400 checks if there are other carrier frequencies in which there may be sufficient number of remaining RUs (706).

If no carrier frequency exists for which there is a sufficient number of remaining RUs to satisfy the requirements of femto BS 210, femto BS 210 requests multi-carrier support (707). Multi-carrier support means that a femtocell BS simultaneously operates on two or more carrier frequencies with associated RUs. If multi-carrier support is available (707—yes), then network server 400 selects a carrier frequency with the minimum RSSI and assigns all the remaining RUs to the selected carrier frequency (708). Then, network server 400 checks if the required number of RUs of femto BS 210 is greater than the number of assigned RUs. If the required number of RUs of femto BS 210 is not greater (709—no), the process ends. If the required number of RUs of femto BS 210 is greater (709—yes), network server 400 finds another carrier frequency and assigns all the remaining RUs to it (710). Further, network server 400 repeats 709 and 710 until the process ends.

Alternatively, if multi-carrier support is not available (707—no), femto BS 210 scans each RU in the carrier frequency with minimum RSSI to find re-usable RUs (711). A re-usable RU is one at which femto BS 210 operates while also satisfying the interference requirement of other operating femto BSs which operate at the same RU. The re-usable RU may be detected by femto BS 210 based on measurements of signal quality of each RU in the carrier frequency. If a re-usable RU is found (712—yes), then the RU is assigned to the femtocell of femto BS 210 (714). However, if there is not a re-usable RU available at every carrier frequency (712—no), then femto BS 210 applies a different scheme for its operation (713). In one embodiment, the scheme may be a radio resource reservation scheme. For example, such a radio resource reservation scheme could be implemented by femto BS 210. Femto BS 210 would send a request to the associated macro BS (for example, macro BS 102) to reserve a dedicated resource region. This dedicated resource region would then only be used for femto BS 210. Macro BS 102 would not schedule any other user stations in this region until femto BS canceled the reservation or macro BS took back the region.

After selecting the wireless resource, femto BS 210 needs to adjust its transmission power to verify the interference level and ensure self-organization is acceptable to other operating femto BSs. A femto BS has a specified range of transmitting power designated as [P_max; P_min] for femtocell power configuration. P_max is the maximum power for a femto BS to transmit, and P_min is the minimum power. If a femto BS uses a transmission power greater than P_max, it may cause interference, whereas if a femto BS uses a transmission power less than P_min, then it may not be able to maintain robust modulation and coding sets (MCS) to ensure a high data rate. A purpose of power configuration 630 is to find an acceptable transmission power for a new femto BS. Except for initialization of a new femto BS, power configuration 630 can be triggered periodically or by an event. The power configuration may be triggered, based on an event, by a user station such as a mobile station. For example, a user station may initiate the power configuration when or if it detects a problem with a connection. Alternatively, the triggering may be periodic by a network server to check power settings to determine whether the operating power configuration is suitable.

Figure 8:
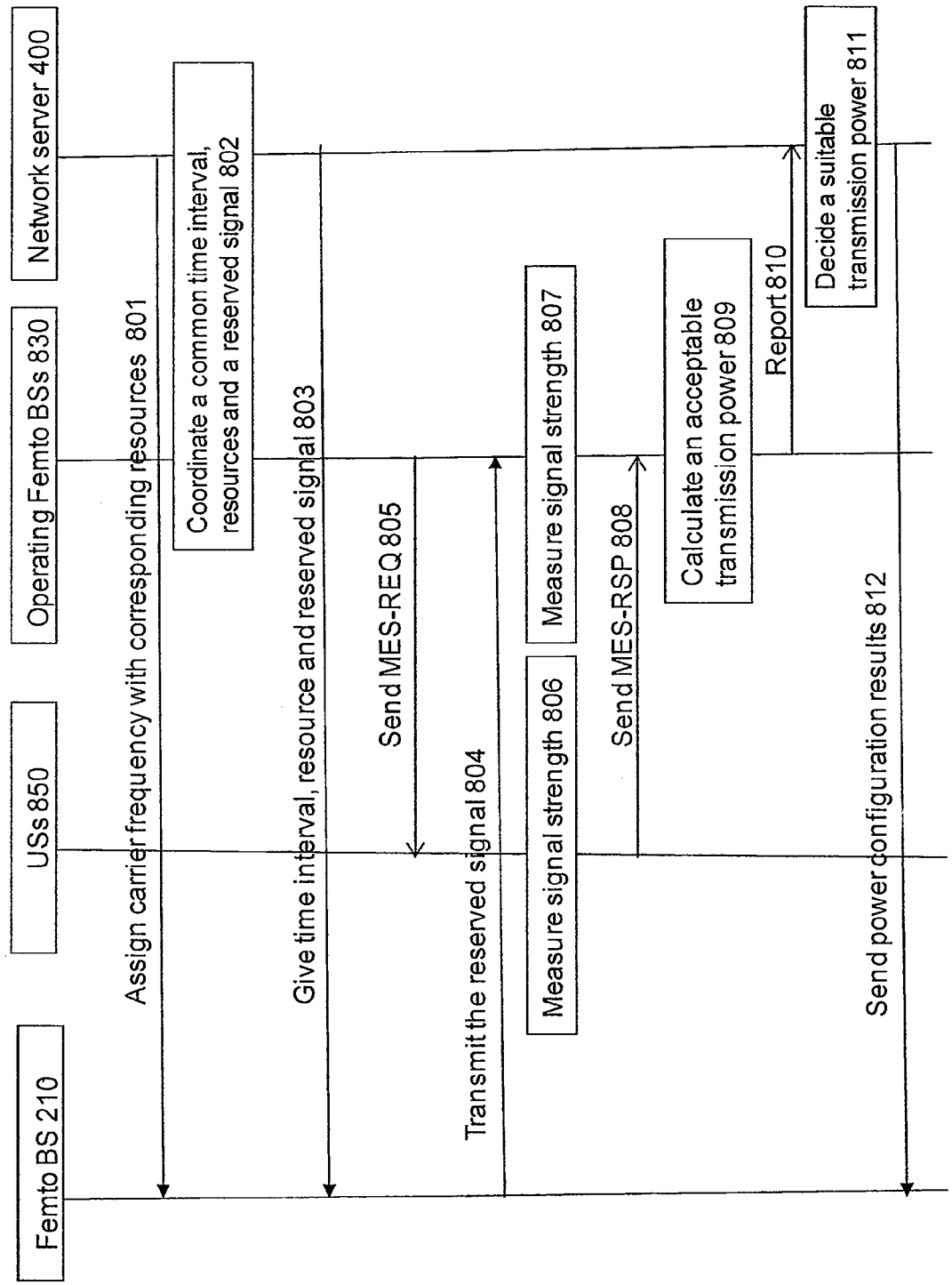
FIG. 8 shows an exemplary process for power configuration of a femto base station.

FIG. 8 shows an exemplary process of power configuration 630 consistent with an embodiment. In accordance with the exemplary process, network server 400 assigns a carrier frequency and corresponding RUs to femto BS 210 (801). Then, network server 400 negotiates with other operating femto BSs 830 having locations close to femto BS 210 and which operate at the same carrier frequency, and coordinates a common time interval and RUs (802). Further, network server 400 reserves a signal for operating femto BSs 830. Next, network server 400 provides information to femto BS 210 regarding the common time interval, RUs and reserved signal (803), and requests femto BS 210 to transmit the reserved signal to user stations (USs) 850 at the common time interval using the power P_max. In response, femto BS 210 transmits the reserved signal (804).

Operating femto BSs 830 request, by sending an MES-REQ message, USs 850 to measure the signal strength of the reserved signal (805). Then, operating femto BSs 830, together with USs 850, measure signal strength (806 and 807). USs 850 report the results of the measurements to operating femto BSs 830 by an MES-RSP message (808). After receiving measurement results from USs 850, operating femto BSs 830 calculate an acceptable transmission power for femto BS 210 (809). If USs 850 do not join the measurement process, operating femto BSs 830 calculate the acceptable transmission power for femto BS 210 based on its measurement results.

Operating femto BSs 830 then report the acceptable transmission power of femto BS 210 to network server 400 (810), and network server 400 chooses an acceptable transmission power for femto BS 210 (811). Then, network server 400 sends the power configuration results to femto BS 210 (812).

Alternatively, in another exemplary process of power configuration 630, network server 400 may calculate the acceptable transmission power (not shown in FIG. 8). In this alternative embodiment, operating femto BSs 830 report the measurement results and other information to network server 400. If USs 850 do not join the measurement process, operating femto BSs 830 report only their measurement result. Then, network server 400 computes the acceptable transmission power for femto BS 210.

The details of how network server 400 computes the transmission power for femto BS 210 is described next. Each femto BS has a robust MCS requirement, and the robust MCS maps into a signal to interference-plus-noise ratio (SINR) requirement. The SINR is a function of transmission power and interference as shown in equation (2):

$$SINR = \frac{P_c}{\text{thermal\_noise} + P_d}. \quad (2)$$

in which $P_c$ is the transmission power of the femto BS, thermal_noise is the noise internal to the femto BS, and $P_d$ is the interference which the femto BS detects.

When a femto BS transmits a signal, the receive signal strength may be affected by factors such as path loss or shadowing effect, etc. The relationship between power transmission strength and receive signal strength is represented in equation (3):

$$P_r = P_t \cdot g. \quad (3)$$

where $P_r$ is the received power, $P_t$ is the transmitter power and g is a power fading parameter representative of the parameters of path loss, shadowing and fast fading. For example, as shown in FIG. 2, femto BS 114 operates in the carrier frequency CF2 and uses transmission power $P_{t1}$. The robust MCS which femto BS 114 supports is 16 QAM (½) and the corresponding SINR value is $S_1$. Femto BS 210 is a new femtocell BS and network server 400 assigns the same carrier frequency CF2 for its operations and a transmitting power range of [P_Max,P_Min]. In power configuration 630, network server 400 negotiates with femto BS 114 to define a common time interval and RUs, and reserves a signal (or code). Moreover, network server 400 requests from femto BS 210 to transmit the reserved signal within the common time interval/RU at a predetermined transmission power, for example P_Max. At the common time interval, femto BS 114 detects the signal from femto BS 210, measures the signal strength $P_{r1}$, and generates a measurement report. After receiving the measurement report, network server 400 computes the power fading parameter $g_1$ between femto BS 210 and femto BS 114 by using equation (4):

$$g_1 = P\_\text{Max} - P_{r1}. \quad (4)$$

Network server 400 also computes a maximum interference $P_{tolerate\_1}$ which femto BS 114 can tolerate by using equation (5) such that the SINR of femto BS 114 is greater than $S_1$:

$$P_{tolerate\_1} \leq \frac{P_{r1} - \text{thermal\_noise} \times S_1}{S_1} = \frac{P_{r1}}{S_1} \text{thermal\_noise}. \quad (5)$$

Network server 400 also computes a transmission power P_accept$_1$ for femto BS 210 which can be tolerated by femto BS 114, by using equation (6):

$$P\_\text{accept}_1 = P_{tolerate\_1} + g_1. \quad (6)$$

Based on equations (4) and (5), equation (6) can be restated as:

$$P\_\text{accept}_1 \leq \frac{P_{r1}}{S_1} - \text{thermal\_noise} + P\_\text{Max} - P_{r1}. \quad (7)$$

If there are n femto BSs operating at the carrier frequency CF2, network server 400 can compute n transmission powers P_accept$_1$, ..., P_accept$_n$ for femto BS 210. Moreover, the acceptable power of femto BS 210 is the minimum of P_accept and P_Max, as set forth in equation (8):

$$P_{accept} = \min\{P\_\text{accept}_1, \ldots, P\_\text{accept}_n, P\_\text{Max}\}. \quad (8)$$

If P_accept is less than P_Min, then a new femto BS needs to operate with low power to avoid interferences. However, such operation degrades its throughput performance. Therefore, network server 400 repeats the self-organization and configuration process to reselect a better carrier frequency for operations. Through the disclosed method, network server 400 can find a suitable carrier frequency, resource allocation, and power allocation for a femtocell to operate with higher spectrum utilization and performance.

Other embodiments will be apparent to those skilled in the art from consideration of the specification and practice of the embodiment of which details are disclosed herein. This application is intended to cover any variations, uses, or adaptations following the general principles thereof and including such departures from the present disclosure as come within known or customary practice in the art. It is intended that the specification and examples be considered as exemplary only, with a true scope and spirit of the embodiments of the invention being indicated by the following claims.

While the embodiments herein are directed to a femto BS joining other operating femto BSs, a macro BS and a network server to self-configure and operate according to determined parameters, the present invention is not limited by such embodiments. Other embodiments consistent with the present invention may include, for example, configuring operating parameters of a macro BS or another type of base station based on communication with the at least one other operating base station of any kind, in a manner analogous to that described herein for a joining femto BS.

It will be appreciated that the embodiments of the present invention is not limited to the exact construction that has been described above and illustrated in the accompanying drawings, and that various modifications and changes can be made without departing from the scope thereof.

What is claimed is:

1. A femto base station in a femtocell, the femto base station comprising:
   an interface for providing communication with at least one other base station and communication with a network server in a communication system;
   a processor coupled to the interface;
   a memory coupled to the processor, wherein the memory stores program instructions executable by the processor to:
      connect to the network server using the interface;
      send information to the network server regarding femtocell capability;
      receive a plurality of carrier frequencies from the network server;
      measure signal strengths corresponding to the plurality of carrier frequencies;
      report the signal strengths to the network server;
      receive from the network server information including an assignment of a number of resource units and an assignment of at least one of the plurality of carrier frequencies, wherein the number of resource units is calculated based on the femtocell capability, and the at least one of the plurality of carrier frequencies is selected by the network server based on the reported signal strengths;
   configure operating parameters of the femto base station based on the received information, including to configure transmission power of the femto base station; and
   operate the femto base station based on the operating parameters.

2. The femto base station of claim 1, wherein the information regarding femtocell capability includes information related to a backhaul capability, a multi-carrier support capability, supporting link adaptation capability and an allowable power region.

3. The femto base station of claim 1, wherein the program instructions are further executable by the processor to receive network information from the network server, the network information including bandwidths and radio resource units associated with the plurality of carrier frequencies.

4. The femto base station of claim 1, wherein the program instructions to configure the operating parameters further comprise instructions executable by the processor to scan the plurality of carrier frequencies.

5. The femto base station of claim 1, wherein the femto base station is a first femto base station and wherein the program instructions further comprise instructions executable by the processor to:
   transmit, to at least one second femto base station, a signal and at least one resource within a common time interval at a predetermined transmission power, wherein the signal, the at least one resource and the common time interval are determined based on communication with the at least one second femto base station; and
   adjust the transmission power of the first femto base station based on a set of measurements of the signal performed by the at least one second femto base station.

6. The femto base station of claim 5, wherein the program instruction to adjust the transmission power of the first femto base station further comprises instructions executable by the processor to:
   receive the set of measurements from the at least one second femto base station; and
   report the set of measurements to the network server.

7. A network server comprising:
   an interface for providing communication with at least one femto base station;
   a processor coupled to the interface;
   a memory coupled to the processor, wherein the memory stores program instructions executable by the processor to:
      connect to the at least one femto base station using the interface;
      receive information from the femto base station regarding femtocell capability;
      calculate a number of resource units for the femto base station based on the femtocell capability;
      assign the number of resource units to the femto base station based on a calculation associated with the femtocell capability information;
      send network information to the femto base station;
      receive, from the femto base station, signal strengths corresponding to a plurality of carrier frequencies included in the network information;
      select at least one carrier frequency from the plurality of carrier frequencies based on the signal strengths and the femtocell capability information; and
      assign the selected at least one carrier frequency to the femto base station.

8. The network server of claim 7, wherein the network information comprises the plurality of carrier frequencies and associated bandwidths.

9. The network server of claim 7, wherein the femtocell capability information comprises information related to backhaul capability, multi-carrier support capability, supporting link adaptation capability and allowable power region.

10. The network server of claim 7, wherein the femto base station is a first femto base station, the program instructions being further executable to:
    identify a common time interval, at least one resource and a signal based on communication with at least one second femto base station;
    instruct the first femto base station to transmit the signal and the at least one resource within the common time interval at a predetermined transmission power to the at least one second femto base station; and
    determine an acceptable transmission power for the first femto base station based on a set of measurements from the at least one second femto base station, the set of measurements collected by measuring the signal.

11. A method for performing self-organization and configuration of a femto base station configured to be connected to a network server, the method comprising:
    sending information to the network server regarding femtocell capability;
    receiving a plurality of carrier frequencies from the network server;
    measuring signal strengths corresponding to the plurality of carrier frequencies;
    reporting the signal strengths to the network server;

receiving from the network server information including an assignment of a number of resource units and an assignment of at least one of the plurality of carrier frequencies, wherein the number of resource units is calculated based on the femtocell capability and the at least one of the plurality of carrier frequencies is selected by the network server based on the reported signal strengths;

configuring operating parameters of the femto base station based on the received information, including configuring transmission power of the femto base station; and operating the femto base station based on the operating parameters.

12. The method of claim 11 further comprising receiving network information from the network server, the network information including bandwidths and radio resource units associated with the plurality of carrier frequencies.

13. The method of claim 11, wherein configuring operating parameters further comprises scanning the plurality of carrier frequencies.

14. The method of claim 11, wherein the femto base station is a first femto base station, wherein configuring the transmission power further comprises:

transmitting, to at least one second femto base station, a signal and at least one resource within a common time interval at a predetermined transmission power, wherein the signal, the at least one resource and the common time interval are determined based on communication with the at least one second femto base station; and adjusting the transmission power of the first femto base station based on an acceptable power computed based on a set of measurements of the signal.

15. The method of claim 14, the at least one second femto base station is selected based on having the same carrier frequency as the first femto base station and being near the first femto base station.

16. The method of claim 11, wherein configuring the transmission power is triggered periodically.

17. The method of claim 16, wherein configuring the transmission power is triggered by at least one associated mobile station.

18. A base station in a cell, the base station comprising:

an interface for providing communication with at least one other base station and communication with a network server in a communication system;

a processor coupled to the interface;

a memory coupled to the processor, wherein the memory stores program instructions executable by the processor to:

connect to the network server using the interface;

send information to the network server regarding cell capability;

receive a plurality of carrier frequencies from the network server;

measure signal strengths corresponding to the plurality of carrier frequencies;

report the signal strengths to the network server;

receive from the network server information including an assignment of a number of resource units and an assignment of at least one of the plurality of carrier frequencies, wherein the number of resource units is calculated based on the cell capability and the at least one of the plurality of carrier frequencies is selected by the network server based on the reported signal strengths;

configure operating parameters of the base station based on the received information, including to configure transmission power of the base station; and operate the base station based on the operating parameters.

19. The base station of claim 18, wherein the base station is a first base station, wherein the program instruction to configure the transmission power further comprises instructions executable by the processor to:

transmit, to at least one second base station, a signal and at least one resource within a common time interval at a predetermined transmission power, wherein the signal, the at least one resource and the common time interval are determined based on communication with the at least one second base station; and adjust the transmission power of the first base station based on a set of measurements of the signal performed by the at least one second base station.

20. A method for performing self-organization and configuration of a base station configured to be connected to a network server, the method comprising:

sending information to the network server regarding cell capability;

receiving a plurality of carrier frequencies from the network server;

measuring signal strengths corresponding to the plurality of carrier frequencies;

reporting the signal strengths to the network server;

receiving from the network server information including an assignment of a number of resource units and an assignment of at least one of the plurality of carrier frequencies, wherein the number of resource units is calculated based on the cell capability and the at least one of the plurality of carrier frequencies is selected by the network server based on the reported signal strengths;

configuring operating parameters of the base station based on the received information, including configuring transmission power of the base station; and operating the base station based on the operating parameters.

21. The method of claim 20, wherein the base station is a first base station, wherein configuring the transmission power further comprises:

transmitting, to at least one second base station, a signal and at least one resource within a common time interval at a predetermined transmission power, wherein the signal, the at least one resource and the common time interval are determined based on communication with the at least one second base station; and adjusting the transmission power of the first base station based on an acceptable power computed based on a set of measurements of the signal.

22. The method of claim 20, wherein the configuring the transmission power is triggered periodically.

23. The method of claim 20, wherein the configuring the transmission power is triggered by at least one associated mobile station.

24. A first femto base station in a femtocell, the first femto base station comprising:

an interface for providing communication with at least one other base station and communication with a network server in a communication system;

a processor coupled to the interface;

a memory coupled to the processor, wherein the memory stores program instructions executable by the processor to:

connect the first femto base station to the network server using the interface;

send information to the network server regarding the first femtocell capability;

configure operating parameters of the first femto base station based on the sent information, including to configure transmission power of the first femto base station;

transmit, to at least one second femto base station, a signal and at least one resource within a common time interval at a predetermined transmission power, wherein the signal, the at least one resource, and the common time interval are determined based on communication with the at least one second femto base station, and operate the first femto base station based on the operating parameters.

25. The first femto base station of claim 24, wherein the program instruction to configure the transmission power further comprises instructions executable by the processor to adjust the transmission power of the first femto base station based on a set of measurements of the signal performed by the at least one second femto base station.

* * * * *